United States Patent
Iwaki

(10) Patent No.: US 12,410,490 B2
(45) Date of Patent: Sep. 9, 2025

(54) GRAIN-ORIENTED ELECTRICAL STEEL SHEET, AND METHOD FOR MANUFACTURING GRAIN-ORIENTED ELECTRICAL STEEL SHEET

(71) Applicant: NIPPON STEEL CORPORATION, Tokyo (JP)

(72) Inventor: Masataka Iwaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 296 days.

(21) Appl. No.: 17/921,826

(22) PCT Filed: Jul. 15, 2020

(86) PCT No.: PCT/JP2020/027455
§ 371 (c)(1),
(2) Date: Oct. 27, 2022

(87) PCT Pub. No.: WO2022/013960
PCT Pub. Date: Jan. 20, 2022

(65) Prior Publication Data
US 2023/0175090 A1 Jun. 8, 2023

(51) Int. Cl.
*C21D 8/12* (2006.01)
*C21D 9/46* (2006.01)
(Continued)

(52) U.S. Cl.
CPC ......... *C21D 8/1288* (2013.01); *C21D 8/1233* (2013.01); *C21D 8/1261* (2013.01);
(Continued)

(58) Field of Classification Search
None
See application file for complete search history.

(56) References Cited

U.S. PATENT DOCUMENTS 4,293,350 A * 10/1981 Ichiyama ............... C21D 10/00
148/120
4,456,812 A * 6/1984 Neiheisel ............. C21D 8/1294
148/903
(Continued)

FOREIGN PATENT DOCUMENTS

BR 112012031908 B1 * 4/2019 ............... C21D 1/26
CN 102941413 A * 2/2013
(Continued)

OTHER PUBLICATIONS

Machine Translation of JP-2017095745-A, Jun. 2017 (Year: 2017).*

*Primary Examiner* — Jeffrey A Vonch
(74) *Attorney, Agent, or Firm* — Birch, Stewart, Kolasch & Birch, LLP

(57) ABSTRACT

This grain-oriented electrical steel sheet is a grain-oriented electrical steel sheet including a base steel sheet and a tension coating, in which, when an average coating thickness of a flat surface coating portion is referred to as t1 (μm), a minimum coating thickness of a groove forming surface coating portion is referred to as $t2_{Min}$ (μm), and a maximum coating thickness of the groove forming surface coating portion is referred to as $t2_{Max}$ (μm), Expressions (1) and (2) are satisfied, and when a value of 0.95 times a distance D of the tension coating along a sheet thickness direction from a bottom surface position of the groove forming surface coating portion to a bottom surface position of the flat surface coating portion is referred to as an effective depth d (μm), Expression (3) is satisfied.

$$t2_{Min}/t1 \geq 0.4 \quad (1)$$

$$t2_{Max}/t1 \leq 3.0 \quad (2)$$

$$t2_{Max} \leq d/2 \quad (3)$$

18 Claims, 3 Drawing Sheets

(51) Int. Cl.
  *C22C 38/00* (2006.01)
  *C23C 22/00* (2006.01)
  *C23C 22/08* (2006.01)
  *C23C 22/74* (2006.01)
  *H01F 1/147* (2006.01)
  *H01F 1/18* (2006.01)
  *C22C 38/08* (2006.01)
  *C22C 38/14* (2006.01)
  *C22C 38/16* (2006.01)
  *C22C 38/18* (2006.01)
  *C22C 38/60* (2006.01)

(52) U.S. Cl.
  CPC ......... *C21D 8/1272* (2013.01); *C21D 8/1283* (2013.01); *C21D 8/1294* (2013.01); *C21D 9/46* (2013.01); *C23C 22/00* (2013.01); *C23C 22/08* (2013.01); *C23C 22/74* (2013.01); *H01F 1/147* (2013.01); *H01F 1/18* (2013.01); *C21D 2201/05* (2013.01); *C22C 38/00* (2013.01); *C22C 38/002* (2013.01); *C22C 38/004* (2013.01); *C22C 38/008* (2013.01); *C22C 38/08* (2013.01); *C22C 38/14* (2013.01); *C22C 38/16* (2013.01); *C22C 38/18* (2013.01); *C22C 38/60* (2013.01); *H01F 1/14783* (2013.01); *Y10T 428/24521* (2015.01); *Y10T 428/24537* (2015.01); *Y10T 428/24545* (2015.01); *Y10T 428/24587* (2015.01); *Y10T 428/24851* (2015.01); *Y10T 428/24917* (2015.01); *Y10T 428/24926* (2015.01); *Y10T 428/2495* (2015.01); *Y10T 428/265* (2015.01); *Y10T 428/266* (2015.01)

(56) References Cited

U.S. PATENT DOCUMENTS

| | | | |
|---|---|---|---|
| 4,655,854 A * | 4/1987 | Nishiike | C21D 8/1294 148/113 |
| 4,750,949 A | 6/1988 | Kobayashi et al. | |
| 4,753,692 A * | 6/1988 | Kuroki | C21D 8/12 148/113 |
| 4,904,312 A * | 2/1990 | Beckley | H01C 1/16 205/684 |
| 5,123,977 A * | 6/1992 | Price | C21D 8/1294 148/113 |
| 5,185,043 A * | 2/1993 | Nishike | B08B 7/022 148/113 |
| 5,203,928 A * | 4/1993 | Inokuti | C21D 8/1294 148/112 |
| 5,312,496 A * | 5/1994 | Ames | C21D 8/1233 148/111 |
| 5,393,355 A * | 2/1995 | Nakano | H01F 1/18 148/306 |
| 5,411,604 A * | 5/1995 | Inokuti | C21D 9/56 148/112 |
| 5,463,889 A * | 11/1995 | Snyder | B21B 27/005 72/197 |
| 5,565,272 A * | 10/1996 | Masui | H01F 1/14783 148/309 |
| 5,571,342 A * | 11/1996 | Komatsubara | C21D 3/04 427/127 |
| 5,588,321 A * | 12/1996 | Snyder | C21D 8/1294 148/111 |
| 5,653,821 A * | 8/1997 | Choi | H04N 19/107 148/113 |
| 5,840,131 A * | 11/1998 | Yakashiro | C21D 8/1283 148/113 |
| 6,280,862 B1 * | 8/2001 | Inokuti | H01F 1/14783 428/167 |
| 6,331,215 B1 * | 12/2001 | Toge | C22C 38/02 148/113 |
| 6,368,424 B1 * | 4/2002 | Sakai | H01F 1/16 148/120 |
| 6,524,400 B1 * | 2/2003 | Pircher | C21D 8/1205 148/113 |
| 6,562,473 B1 * | 5/2003 | Okabe | H01F 1/14775 148/310 |
| 2002/0157734 A1 * | 10/2002 | Senda | C22C 38/06 148/307 |
| 2004/0040629 A1 * | 3/2004 | Hamamura | C21D 8/1294 148/307 |
| 2005/0112377 A1 * | 5/2005 | Schuhmacher | C23C 16/26 428/408 |
| 2005/0126659 A1 * | 6/2005 | Homma | H01F 41/0206 148/307 |
| 2006/0169362 A1 * | 8/2006 | Sakai | H01F 41/0233 148/110 |
| 2009/0047537 A1 * | 2/2009 | Nanba | C22C 38/04 428/545 |
| 2009/0139609 A1 * | 6/2009 | Gunther | C22C 38/02 148/111 |
| 2009/0145526 A1 * | 6/2009 | Arai | H01F 1/16 148/306 |
| 2009/0272464 A1 * | 11/2009 | Hamamura | C21D 8/12 148/400 |
| 2010/0055481 A1 * | 3/2010 | Kubo | H01F 1/14775 428/471 |
| 2010/0279141 A1 * | 11/2010 | Iwata | C21D 8/1294 219/121.72 |
| 2011/0209798 A1 * | 9/2011 | Natori | C22C 38/06 148/318 |
| 2013/0017408 A1 * | 1/2013 | Sakai | C21D 8/1294 219/121.72 |
| 2013/0133783 A1 * | 5/2013 | Yamaguchi | C21D 8/1261 148/307 |
| 2013/0139932 A1 * | 6/2013 | Sakai | H01F 41/0206 148/307 |
| 2013/0143003 A1 * | 6/2013 | Takenaka | C21D 10/00 428/174 |
| 2013/0143004 A1 | 6/2013 | Takashima et al. | |
| 2013/0177743 A1 | 7/2013 | Watanabe et al. | |
| 2013/0189490 A1 * | 7/2013 | Watanabe | C21D 8/1283 428/164 |
| 2014/0034193 A1 * | 2/2014 | Duman | H01F 1/14775 148/121 |
| 2014/0234638 A1 * | 8/2014 | Takajo | C21D 8/1283 427/444 |
| 2014/0251514 A1 * | 9/2014 | Watanabe | C22C 38/04 148/645 |
| 2014/0338792 A1 * | 11/2014 | Takajo | C22C 38/02 148/306 |
| 2015/0034211 A1 * | 2/2015 | Takajo | C21D 1/34 148/306 |
| 2015/0064481 A1 * | 3/2015 | Schoen | C22C 38/008 148/307 |
| 2015/0111004 A1 * | 4/2015 | Senda | C25F 3/06 428/164 |
| 2015/0187474 A1 * | 7/2015 | Takajo | H01F 1/16 148/112 |
| 2015/0243419 A1 * | 8/2015 | Senda | C21D 8/1272 148/111 |
| 2015/0248957 A1 * | 9/2015 | Takajo | C22C 38/002 148/112 |
| 2016/0177413 A1 * | 6/2016 | Kwon | C22C 38/00 148/307 |
| 2016/0194731 A1 * | 7/2016 | Han | C22C 38/04 148/111 |
| 2016/0196909 A1 * | 7/2016 | Takenaka | C22C 38/44 148/111 |
| 2016/0230240 A1 * | 8/2016 | Senda | C21D 9/46 |
| 2017/0263357 A1 * | 9/2017 | Senda | C22C 38/00 |
| 2017/0369960 A1 * | 12/2017 | Kwon | C22C 38/04 |
| 2018/0010206 A1 * | 1/2018 | Kwon | C21D 8/1244 |
| 2018/0036838 A1 * | 2/2018 | Hamamura | C21D 8/1294 |
| 2018/0071869 A1 * | 3/2018 | Sakai | C22C 38/02 |
| 2018/0147663 A1 * | 5/2018 | Takajo | C23F 1/28 |
| 2018/0237876 A1 * | 8/2018 | Hecht | C22C 38/02 |

(56) References Cited

U.S. PATENT DOCUMENTS

| | | | |
|---|---|---|---|
| 2018/0371573 A1* | 12/2018 | Kwon | B23K 26/364 |
| 2019/0321920 A1* | 10/2019 | Kwon | C21D 8/12 |
| 2020/0010917 A1* | 1/2020 | Terashima | C21D 8/1294 |
| 2020/0058434 A1* | 2/2020 | Zhao | C21D 8/1222 |
| 2020/0283863 A1* | 9/2020 | Senda | H01F 1/16 |
| 2020/0362431 A1 | 11/2020 | Takahashi et al. | |
| 2021/0023659 A1* | 1/2021 | Chu | C21D 8/1294 |
| 2021/0027922 A1* | 1/2021 | Yasuda | C22C 38/04 |
| 2021/0060694 A1* | 3/2021 | Park | B23K 26/356 |
| 2021/0101230 A1* | 4/2021 | Wu | C21D 8/12 |
| 2021/0130922 A1* | 5/2021 | Kwon | C21D 8/1288 |
| 2022/0042124 A1* | 2/2022 | Kwon | H01F 1/16 |
| 2022/0042126 A1* | 2/2022 | Kwon | C21D 9/46 |
| 2022/0044855 A1* | 2/2022 | Kwon | B23K 26/364 |
| 2022/0051836 A1* | 2/2022 | Park | C21D 1/26 |
| 2022/0170130 A1* | 6/2022 | Watanabe | C22C 38/008 |

FOREIGN PATENT DOCUMENTS

| | | | | | |
|---|---|---|---|---|---|
| EP | 0201228 A2 | * | 11/1986 | | C21D 8/1288 |
| EP | 0 219 611 A1 | | 4/1987 | | |
| EP | 589418 A1 | * | 3/1994 | | C21D 8/12 |
| EP | 992591 A2 | * | 4/2000 | | B23K 26/0619 |
| JP | 40-15644 B | | 7/1965 | | |
| JP | 58-26405 B2 | | 6/1983 | | |
| JP | 59226115 A | * | 12/1984 | | C21D 3/04 |
| JP | 61-117284 A | | 6/1986 | | |
| JP | 61124584 A | * | 6/1986 | | C21D 8/12 |
| JP | 62-45285 B2 | | 9/1987 | | |
| JP | 08176840 A | * | 7/1996 | | |
| JP | 08291390 A | * | 11/1996 | | H01F 1/18 |
| JP | 11279645 A | * | 10/1999 | | |
| JP | 2000063950 A | * | 2/2000 | | |
| JP | 2001032083 A | * | 2/2001 | | |
| JP | 2002194445 A | * | 7/2002 | | |
| JP | 2005059014 A | * | 3/2005 | | |
| JP | 2012-52231 A | | 3/2012 | | |
| JP | 2012-72431 A | | 4/2012 | | |
| JP | 2012177164 A | * | 9/2012 | | |
| JP | 2017095745 A | * | 6/2017 | | |
| JP | 2018066061 A | * | 4/2018 | | |
| KR | 2009116516 A | * | 11/2009 | | |
| KR | 2015073797 A | * | 7/2015 | | C21D 8/12 |
| KR | 2015074932 A | * | 7/2015 | | C23C 30/00 |
| KR | 2016078104 A | * | 7/2016 | | B23K 26/364 |
| KR | 2017074650 A | * | 6/2017 | | B32B 15/04 |
| WO | WO-9724466 A1 | * | 7/1997 | | C21D 8/1294 |
| WO | WO 2012/042865 A1 | | 4/2012 | | |
| WO | WO-2012068868 A1 | * | 5/2012 | | C21D 8/12 |
| WO | WO 2019/156127 A1 | | 8/2019 | | |
| WO | WO-2020149319 A1 | * | 7/2020 | | C21D 1/26 |

* cited by examiner

GRAIN-ORIENTED ELECTRICAL STEEL SHEET, AND METHOD FOR MANUFACTURING GRAIN-ORIENTED ELECTRICAL STEEL SHEET

TECHNICAL FIELD OF THE INVENTION

The present invention relates to a grain-oriented electrical steel sheet mainly used as a core of an electric device such as a transformer and a method for manufacturing a grain-oriented electrical steel sheet.

RELATED ART

A grain-oriented electrical steel sheet is used in many electric devices as a magnetic core.

The grain-oriented electrical steel sheet is a steel sheet in which 0.8% to 4.8% of Si is contained and the crystal orientation of the product is highly concentrated in a {110}<001> orientation. As the magnetic characteristics, the grain-oriented electrical steel sheet is required to have a high magnetic flux density (represented by $B_8$ value) and a low iron loss (represented by W17/50). In particular, recently, there is an increasing demand for a reduction in power loss from the viewpoint of energy saving.

In response to this demand, a technique for refining magnetic domains has been developed to reduce an iron loss in a grain-oriented electrical steel sheet. A method for refining magnetic domains and reducing an iron loss by irradiating a steel sheet after final annealing with a laser beam is disclosed in, for example, Patent Document 1. However, since the reduction in iron loss according to this method is by strain introduced by the laser irradiation, the method cannot be used for a wound core transformer that requires stress relief annealing after forming the transformer.

As an improved technique for this, for example, Patent Document 2 discloses a method of removing a part of the surface glass layer of a grain-oriented electrical steel sheet by laser irradiation or the like after final annealing, dissolving the base steel sheet metal using an acid such as hydrochloric acid or nitric acid to form grooves, and thereafter forming a tension coating, thereby refining magnetic domains.

In the steel sheet subjected to such a magnetic domain refinement treatment, when the grooves are formed, the coating, is locally fractured, which causes problems of insulation properties and corrosion resistance. Therefore, a coating is further formed after the grooves are formed.

PRIOR ART DOCUMENTS

Patent Documents

[Patent Document 1] Japanese Examined Patent Application, Second Publication No. S58-26405
[Patent Document 2] Japanese Unexamined Patent Application, First Publication No. S61-117284
[Patent Document 3] Japanese Examined Patent Application, Second Publication No. S62-45285
[Patent Document 4] Japanese Examined Patent Application, Second Publication No. S40-15644

DISCLOSURE OF THE INVENTION

Problems to be Solved by the Invention

An object of the present invention is to provide a grain-oriented electrical steel sheet having grooves formed on the surface of the base steel sheet, in which the iron loss is lower than that of an existing product by appropriately controlling the morphology of a tension coating formed on the grooves while maintaining insulation properties and corrosion resistance.

Means for Solving the Problem

Aspects of the present invention are as follows.

(1) According to a first aspect of the present invention, there is provided a grain-oriented electrical steel sheet including: a base steel sheet having a flat surface and a groove forming surface on which a groove is formed; and a tension coating formed on the base steel sheet and containing a compound of phosphoric acid, phosphate, chromic anhydride, chromate, alumina, or silica, in which the tension coating has a flat surface coating portion formed on the flat surface and a groove forming surface coating portion formed on the groove forming surface, when an average coating thickness of the flat surface coating portion is referred to as t1 (μm), a minimum coating thickness of the groove forming surface coating portion is referred to as $t2_{Min}$ (μm), and a maximum coating, thickness of the groove forming surface coating portion is referred to as $t2_{Max}$ (μm). Expressions (1) and (2) are satisfied, and when a value of 0.95 times a distance D of the tension coating along a sheet thickness direction from a bottom surface position of the groove forming surface coating portion to a bottom surface position of the flat surface coating portion is referred to as an effective depth d (μm), Expression (3) is satisfied.

$$t2_{Min}/t1 \geq 0.4 \qquad (1)$$

$$t2_{Max}/t1 \leq 3.0 \qquad (2)$$

$$t2_{Max} \leq d/2 \qquad (3)$$

(2) The grain-oriented electrical steel sheet according to (1) may further include: a glass coating formed between the base steel sheet and the tension coating and containing $Mg_2SiO_4$.

(3) In the grain-oriented electrical steel sheet according to (1) or (2), when a width of the groove forming surface is referred to as w (μm), Expression (4) may be satisfied.

$$d/w \geq 1/3 \qquad (4)$$

(4) In the grain-oriented electrical steel sheet according, to any one of (1) to (3), when a width of the groove forming surface is referred to as w (μm). Expression (5) may further be satisfied.

$$(d/w) \times t2_{Max} \leq t1 \qquad (5)$$

(5) According to a second aspect of the present invention, there is provided a method for manufacturing a grain-oriented electrical steel sheet including: cold rolling step of manufacturing a cold-rolled steel sheet; a final annealing step of performing final annealing with secondary recrystallization on the cold-rolled steel sheet; a groove forming step of forming a linear groove on the cold-rolled steel sheet before or after the final annealing step in a direction intersecting a rolling direction of the cold-rolled steel sheet; and a tension coating applying step of forming a tension coating containing a compound of phosphoric acid, phosphate, chromic anhydride, chromate, alumina, or silica on the groove.

(6) The method for manufacturing a grain-oriented electrical steel sheet according to (5) may further include: after the tension coating applying step, a tension coating shaping step of shaping the tension coating by processing the tension coating to leave a part of the tension coating in a thickness direction and reduce a thickness of a portion of the tension coating formed on the groove in a range narrower than a width of the groove.

(7) The method for manufacturing a grain-oriented electrical steel sheet according to (5) or (6) may further include: an annealing separating agent applying step of applying an annealing separating agent to the cold-rolled steel sheet after the cold rolling step and before the final annealing step, in which the annealing separating agent contains magnesia.

Effects of the Invention

According to the above aspects of the present invention, there is provided a grain-oriented electrical steel sheet having a lower iron loss than that in an existing product while maintaining insulation properties and corrosion resistance, and a method for manufacturing the same.

EMBODIMENTS OF THE INVENTION

Figure 1:
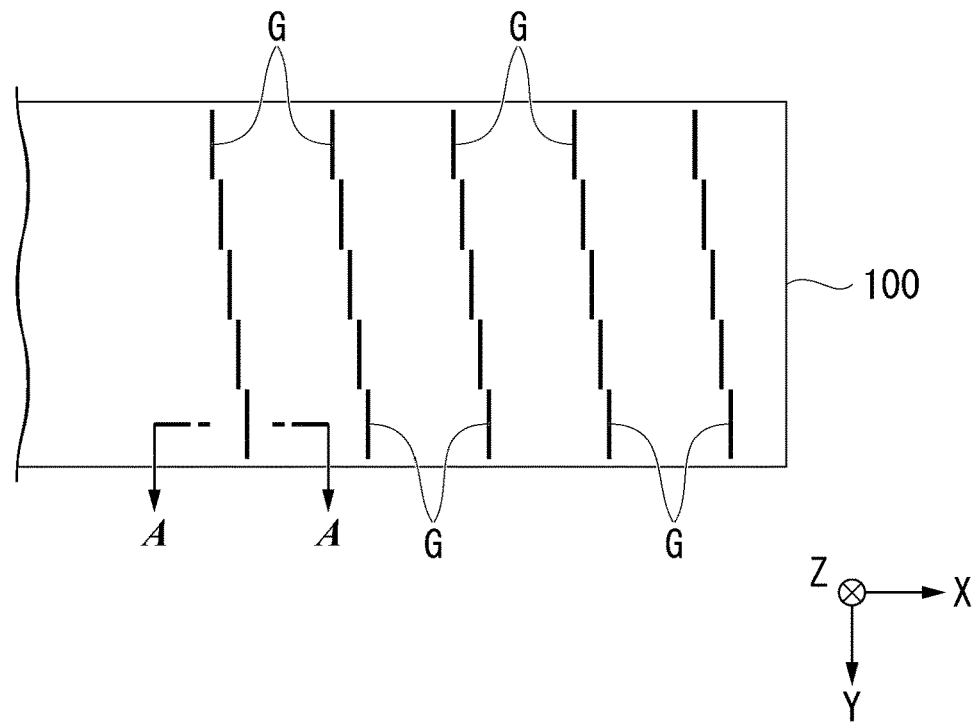
FIG. 1 is a plan view of a grain-oriented electrical steel sheet according to a first embodiment.

In general, in a grain-oriented electrical steel sheet a coating is formed on the surface, of the base steel sheet to apply tension in a magnetization direction (rolling direction) of the steel sheet, thereby achieving a reduction in iron loss. However, the present inventor recognized that in a grain-oriented electrical steel sheet in which grooves are formed on the surface of the base steel sheet by a chemical treatment, a physical treatment, or a thermal treatment for magnetic domain control, the formation of a coating after the formation of the grooves may cause an increase in iron loss.

While examining the reason for this, it was thought that the formation of the coating on a groove wall surface had an adverse effect on the magnetization of the steel sheet in the rolling direction.

The groove wall surface is a surface (a surface having a component in a sheet thickness direction) deviating from the surface of the base steel sheet. Therefore, in a case where a coating is formed on the groove wall surface, tension due to the coating acts in a direction deviating from the magnetization direction of the base steel sheet (a direction parallel to the surface of the base steel sheet, the rolling direction), and becomes a factor to an increase in the iron loss. In particular, a coating solution for forming a coating tends to accumulate in the groove, and it is considered that the formation of a thick coating also has a large adverse effect on the increase in iron loss.

Furthermore, in a grain-oriented steel sheet in which grooves are formed, a magnetic flux that reaches one groove wall through the inside of the steel sheet passes through the groove space along the magnetization direction by leaking from the domain wall (that is, due to the leakage of the magnetic flux), reaches the other groove wall, and is directed again in the magnetization direction inside the steel sheet.

Here, a coating formed on the groove wall surface having a component in a direction nearly perpendicular to the rolling direction X suppress the leakage of the magnetic flux as tension is applied in a direction deviating from the magnetization direction of the steel sheet as described above. Therefore, the effect of reducing the iron loss is hindered.

Accordingly, in order to allow the groove wall surface to leak a large amount of magnetic flux, it can be said that it is effective to make the coating formed on the groove wall surface as thin as possible. However, from the viewpoint of insulation properties and corrosion resistance, excessively thinning the coating formed on the groove is not a practical solution.

Based on the above examination, the present inventor found that in a grain-oriented electrical steel sheet in which a part of a coating formed in a groove is processed to appropriately control the thickness of the coating, excellent magnetic characteristics can be exhibited while insulation properties and corrosion resistance are maintained.

The present invention made based on the above findings will be described in detail with reference to the drawings.

In the following description, there are cases where in a grain-oriented electrical steel sheet, a rolling direction is indicated by X, a sheet width direction is indicated by Y, and a sheet thickness direction is indicated by Z. The sheet width direction Y is a direction perpendicular to the rolling direction X and the sheet thickness direction Z.

First Embodiment

FIG. 1 is a plan view of a grain-oriented electrical steel sheet 100 according to a first embodiment of the present invention. As shown in FIG. 1, in the grain-oriented electrical steel sheet 100 according to the present embodiment, grooves G extending linearly in the sheet width direction Y (that is, a direction intersecting the rolling direction X) are formed, FIG. 2 is a schematic end face view corresponding to the line A-A in FIG. 1 and shows a configuration in the vicinity of the groove G.

Figure 2:
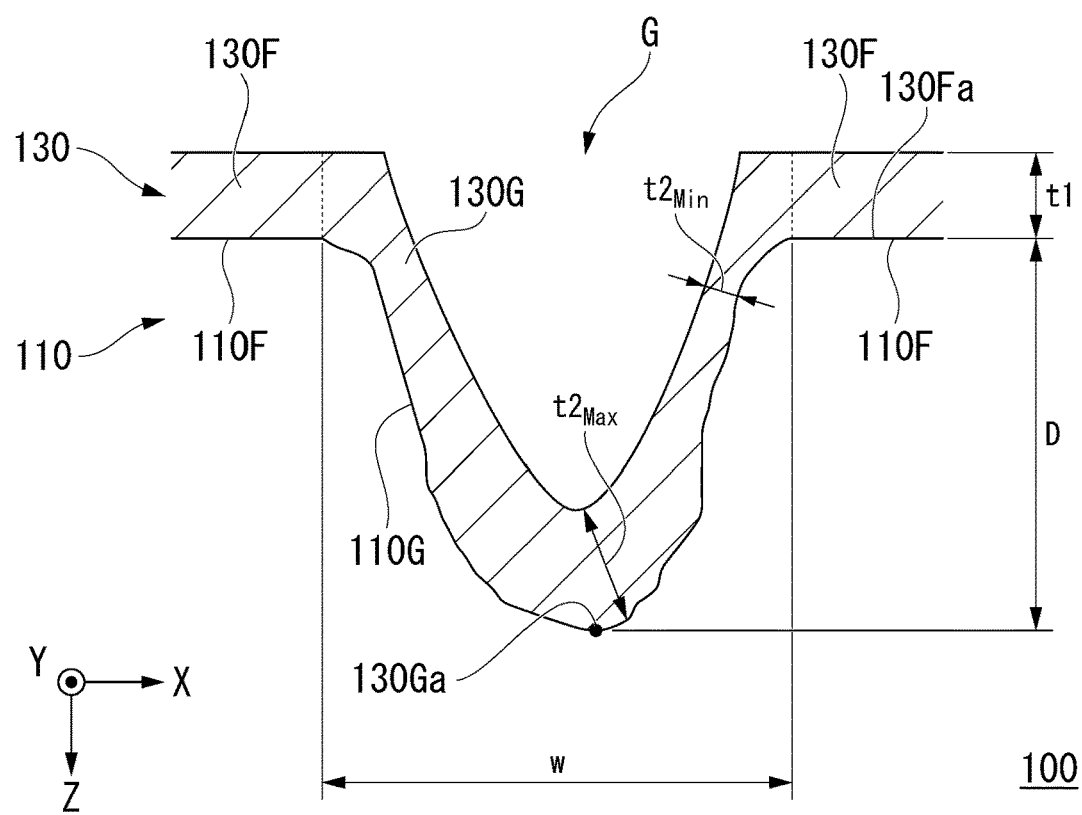
FIG. 2 is a schematic end face view for describing a configuration in the vicinity of a groove of the grain-oriented electrical steel sheet according to the first embodiment.

As shown in FIG. 2, the grain-oriented electrical steel sheet 100 according to the present embodiment is configured to include a base steel sheet 110, and a tension coating 130 which is formed on the base steel sheet 110 and contains a compound of phosphoric acid, phosphate, chromic anhydride, chromate, alumina, or silica.

As shown in FIG. 2, the base steel sheet 110 has a flat surface 110F, which is a surface on which the groove G is not formed, and a groove forming surface 110G, which is a surface on which the groove G is formed.

The tension coating 130 is formed on the base steel sheet 110.

In the following description, in the tension coating 130, a portion formed on the flat surface 110F of the base steel sheet 110 is referred to as a flat surface coating portion 130F, and a portion formed on the groove forming surface 110G of the base steel sheet 110 is referred to as a groove forming surface coating portion 130G.

Hereinafter, dimensions for specifying the morphology of the tension coating 130 in the vicinity of the groove G will be described.

Each dimension can be determined by extracting n (n≥10) grooves G as measurement targets, machining the cross section in a surface perpendicular to the extension direction of each groove G to a mirror finish, and observing the cross section with a scanning electron microscope.

The average value of the thicknesses of the flat surface coating portion 130F in the sheet thickness direction Z is defined as an average coating thickness t1 of the flat surface coating portion 130F.

The average coating thickness t1 can be determined as follows. First, for each of the n grooves G, the thickness of the flat surface coating portion 130F in the sheet thickness direction Z is measured at at least 10 points in the flat surface coating portion 130E in the vicinity of the grooves U, and an average value is obtained. Then, the average coating thickness t1 is determined by calculating the average value of the n average values.

The minimum value of the thickness of the groove forming surface coating portion 130G in the direction perpendicular to the surface is defined as a minimum coating thickness $t2_{Min}$ of the groove forming surface coating portion 130E.

The minimum coating thickness $t2_{Min}$ can be determined as follows. First, for each of the n grooves G, the minimum value of the thickness of the groove forming surface coating portion 130G in the direction perpendicular to the surface thereof is measured. Then, the minimum coating thickness $t2_{Min}$ is determined by calculating the average value of the n measurement values.

The maximum value of the thickness of the groove forming surface coating portion 130G in the direction perpendicular to the surface is defined as a maximum coating thickness $t2_{Max}$ of the groove forming; surface coating portion 130G.

The maximum coating thickness $t2_{Max}$ can be determined as follows. First, for each of the n grooves G, the maximum value of the thickness of the groove forming surface coating portion 130G in the direction perpendicular to the surface thereof is measured. Then, the maximum coating thickness $t2_{Max}$ is determined by calculating the average value of the n measurement values.

A value of 0.95 times a distance D in the sheet thickness direction Z from a bottom surface position 130Ga of the groove forming surface coating portion 130G to a bottom surface position 130Fa of the flat surface coating portion 130F (that is, the boundary between the flat surface coating portion 130F and the base steel sheet 110) is defined as an effective depth d.

The distance D is a dimension corresponding to the depth of the groove G formed in the base steel sheet 110. The thickness of the tension coating 130 formed on a groove wall surface in the vicinity of a shoulder portion of the groove G (a portion connected to the flat surface 110F) has a small effect on iron loss. Therefore, the value, of 0.95×D, which corresponds to a depth of 95% on the bottom side of the groove G, is used here as the effective depth d that contributes to an iron loss reduction effect.

The effective depth d can be determined as follows. First, for each of the n grooves G, the distance in the sheet thickness direction Z from the bottom surface position 130Ga to the bottom surface position 130Fa is measured. Then, the distance D is obtained by calculating the average value of the n measurement values, and the effective depth d is determined based on the distance D.

The separation distance between the two flat surfaces 110F and 110F adjacent to the groove forming surface 110E in the direction perpendicular to the extension direction of the groove G and the sheet thickness direction Z is defined as a width w of the groove forming surface 110G.

The width w can be determined as follows. First, the above-mentioned separation distance is measured for each of the n grooves G. Then, the width w is determined by calculating the average value of the n measurement values.

In the grain-oriented electrical steel sheet 100 according to the present embodiment, the tension coating 130 is formed so that the average coating thickness t1 (μm) of the flat surface coating portion 130F, the minimum coating thickness $t2_{Min}$ (μm) of the groove forming surface coating portion 130G, and the maximum coating thickness $t2_{Max}$ (m) of the groove forming surface coating portion 130G satisfy Expressions (1) and (2) as follows.

$$t2_{Min}/t1 \geq 0.4 \tag{1}$$

$$t2_{Max}/t1 \leq 3.0 \tag{2}$$

In Expressions (1) and (2), the ranges of the minimum value and the maximum value of the thickness (thickness in the direction perpendicular to the surface) of the groove forming surface coating portion 130G are each specified based on the coating thickness of the flat surface coating portion 130F.

In a case where Expression (1) is satisfied, there is no point where the coating of the groove forming surface coating portion 130G is excessively thin with respect to the average coating thickness t1, so that excellent insulation properties and corrosion resistance can be exhibited.

In a case where Expression (2) is satisfied, it can be said that there is no point where the coating of the groove forming surface coating portion 130G is excessively thick with respect to the average coating thickness t1. Therefore, the tension generated in the direction intersecting the surface direction of the steel sheet due to the coating formed on the groove wall surface is not excessively generated. Therefore, the iron loss reduction effect can be sufficiently obtained.

Furthermore, in the grain-oriented electrical steel sheet 100 according to the present embodiment, the maximum coating thickness $t2_{Max}$ (μm) of the tension coating 130 and the effective depth d (μm) of the tension coating 130 satisfy Expression (3) as follows.

$$t2_{Max} \leq d/2 \tag{3}$$

In Expression (3), the range of the maximum value of the thickness of the groove forming surface coating portion 130G (thickness in the direction perpendicular to the surface thereof) is specified based on the effective depth d, which is an index depending on the depth of the groove G.

In a case where Expression (3) is satisfied, it can be said that there is no point where the coating of the groove forming surface coating portion 130G is excessively thick with respect to the effective depth d. Therefore, the tension generated in the direction intersecting the surface direction of the steel sheet due to the coating, formed on the groove wall surface is not excessively generated. Therefore, the iron loss reduction effect can, be sufficiently obtained.

In the grain-oriented electrical steel sheet 100 according to the present embodiment, it is preferable that the effective depth d (μm) of the tension coating 130 and the width w (μm) of the groove forming surface 110G satisfy Expression (4).

$$d/w \geq 1/3 \tag{4}$$

d/w is an index indicating the inclination of the groove wall surface of the groove forming surface 110G In a case where the inclination of the groove wall surface of the groove forming surface 110G is large, it can be said that the groove shape is suitable from the viewpoint of magnetic domain refinement. However, according to the findings of the present inventor, in a case where the d/w is large, the angle difference between the magnetization direction (X direction) of the grain-oriented electrical steel sheet 100 and the tension direction along the groove wall surface due to the tension coating 130 (groove forming surface coating portion 130G) formed on the groove wall surface of the groove forming surface 110E is large. Therefore, in a case where the thickness of the tension coating 130 is not properly controlled, the problem of an increase, in iron, loss becomes significant.

On the other hand, in the grain-oriented electrical steel sheet 100 according to the present embodiment, since the tension coating 130 is formed in which the thickness is controlled so as to satisfy Expressions (1) to (3) as described above, the problem of an increase in iron loss caused by the groove wall surface with a large d/w has been solved.

Therefore, in a case where not only Expressions (1) to (3) but also Expression (4) are satisfied, a reduction in iron loss can be realized while providing a suitable groove shape from the viewpoint of magnetic domain refinement and maintaining insulation properties and the corrosion resistance, which is preferable.

Furthermore, in the grain-oriented electrical steel sheet 100 according to the present embodiment it is preferable that the maximum coating thickness $t2_{Max}$ (µm), the width w (µm), the average coating thickness t1 (µm), and the effective depth d (µm) satisfy Expression (5).

$$(d/w) \times t2_{Max} \leq t1 \quad (5)$$

As described above, the problem of an increase in iron loss that occurs in a case where the thickness of the groove forming surface coating portion 130G of the tension coating 130 is not properly controlled becomes more significant as the angle difference between the magnetization direction of the grain-oriented electrical steel sheet 100 and the tension direction of the groove forming surface coating, portion 130G becomes larger. That is, the larger the d/w, which is the inclination of the groove wall surface, the thinner should be the maximum coating thickness $t2_{Max}$ of the groove forming surface coating portion 130G from the viewpoint of a reduction in iron loss. Furthermore, in the present application, considering that the maximum coating thickness $t2_{Max}$ is specified based on the average coating thickness t1, this effect is specified by Expression (5).

Therefore, in a case where not only Expressions (1) to (3) but also Expression (5) are satisfied, the maximum coating thickness $t2_{Max}$ is more strictly limited in consideration of d/w, the inclination of the groove wall surface. Therefore, the problem of an increase in iron loss can be avoided more reliably.

The morphology of the groove G is preferably in the following range in relation to the effect of the present invention.

The average coating thickness t1 is preferably 1 µm or more, and more preferably 2 µm or more. This is because when the average coating thickness t1 is 1 µm or more, the insulation properties and the corrosion resistance can be exhibited more reliably.

The average coating thickness t1 is preferably 10 µm or less, and more preferably 5 µm or less. This is because when the average coating thickness t1 is 10 µm or less, it is possible to prevent the space factor of the base steel sheet 110 from being significantly lowered.

The width w is preferably 20 µm or more, and more preferably 30 µm or more. This is because when the width w is 20 µm or more, it is technically easy to control the thickness of the groove forming surface coating portion 130G.

The width w is preferably 150 µm or less, and more preferably 90 µm or less. The case where the width w is 150 µm or less is suitable from the viewpoint of magnetic domain refinement. As the width w becomes smaller, the problem of an increase in iron loss caused by the angle difference between the magnetization direction of the grain-oriented electrical steel sheet 100 and the tension direction along the groove wall surface due to the groove forming surface coating portion 130G becomes significant, although the problem also depends on the depth of the groove G Therefore, it can be said that the effect of the present invention is large by appropriately controlling the thickness of the tension coating 130, so that the width w is preferably 150 µm or less.

The distance D is preferably 5 µm or more, and, more preferably 15 µm or more. In a case where the distance D is 5 µm or more, the problem of an increase in iron loss caused by the angle difference between the magnetization direction of the grain-oriented electrical steel sheet 100 and the tension direction along the groove wall surface due to the groove forming surface coating portion 130G becomes significant, although the problem also depends on the width w. Therefore, it can be said that the effect of the present invention is large by appropriately controlling the thickness of the tension; coating 130, so that the distance D is preferably 5 µm or more.

The distance D is preferably 50 µm or less, and more preferably 30 µm or less.

This is because when the distance D is 50 µm or less, it is technically easy to control the thickness of the groove forming surface coating portion 130G. In addition, when the distance D exceeds 50 µm, there are cases where the sheet thickness is partially greatly reduced and the iron loss reduction effect cannot be obtained.

From the viewpoint of a reduction in iron loss, the extension direction of the groove G is preferably in a range of 90 to 60° with respect to the rolling direction X, and more preferably in a range of 90° to 80°.

When the extension direction of the groove G is 60° or more with respect to the rolling direction X, the angle between the groove wall surface of the groove forming surface 110E and the rolling, direction X also becomes large, so that the need for the effect of the present invention to act increases.

The pitch between the grooves G in the rolling direction X (rolling direction pitch) is preferably set in a range of 1 to 20 mm according to the need for magnetic domain refinement. It is more preferable to set the rolling direction pitch between the grooves G to a range of 2 to 10 mm. It is more preferable that the upper limit of the rolling direction pitch between the grooves G is 8 mm. It is more preferable that the upper limit of the rolling direction pitch between the grooves G is 5 mm.

The base steel sheet 110 may contain, as a chemical composition, Si: 0.8% to 4.8% by mass %, and the remainder consisting of Fe and impurities. The chemical composition is a preferable chemical composition for controlling the crystal orientations to be integrated in a {110}<001> orientation.

Furthermore, the base steel sheet 110 may contain known optional elements instead of a portion of Fe for the purpose of improving the magnetic characteristics. Examples of the optional elements contained instead of a portion of Fe include the following elements. Each numerical value means an upper limit in a case where those elements are contained as the optional elements.

By mass %, C: 0.005% or less, Mn: 0.3% or less, S: 0.015% or less, Se: 0.015% or less, Al: 0.050% or less, N: 0.005% or less, Cu: 0.40% or less, Bi: 0.010% or less, B: 0.080% or less, P: 0.50% or less, Ti: 0.015% or less, Sn: 0.10% or, less, Sb: 0.10% or less, Cr: 0.30% or less, Ni: 1.00% or less, and one or two or more of Nb, V, Mo, Ta, and W: 0.030% or less in total.

Since these optional elements may be contained according to a known purpose, it is not necessary to set a lower limit for the amount of the optional elements, and the lower limit may be 0%.

The impurities are not limited to the examples of the optional elements, but mean elements that do not impair the effect of the present invention even if the elements are contained. The impurities are not limited to a case of intentionally adding such elements, and also include elements that are unavoidably incorporated in from ore as a raw material, scrap, or a manufacturing environment when the base steel sheet is industrially manufactured. A target for the upper limit of the total amount of the impurities may be about 5% by mass %.

A grain-oriented electrical steel sheet is generally subjected to decarburization annealing and purification annealing at the time of secondary recrystallization, and is subjected to a relatively large change in, chemical composition (a reduction in amount) in a manufacturing process. Depending on the element, the amount thereof is reduced to 50 ppm or less, and may reach a level that cannot be detected by a general analysis (1 ppm or less) when purification annealing is sufficiently performed. The chemical composition of the base steel sheet 110 is a chemical composition in the final product, and is different from the composition of a slab described later, which is also a starting material.

For example, the chemical composition of the base steel sheet 110 may be measured using inductively coupled plasma-atomic emission spectrometry (ICP-AES). Specifically, the chemical composition is identified by measuring a 35 mm square test piece collected from the base steel sheet 110 with ICPS-8100 manufactured by Shimadzu Corporation (measuring device) or the like under conditions based on a calibration curve prepared in advance. In addition, C and S can be measured using a combustion-infrared absorption method, and N can be measured using an inert gas fusion-thermal conductivity method.

Second Embodiment

Hereinafter, a grain-oriented electrical steel sheet 200 according to a second embodiment of the present invention will be described.

The grain-oriented electrical steel sheet 200 according to the second embodiment is different from the grain-oriented electrical steel sheet 100 according to the first embodiment in that a glass coating is formed between a base steel sheet and a tension coating, Descriptions that overlap the descriptions in the first embodiment will be omitted.

Figure 3:
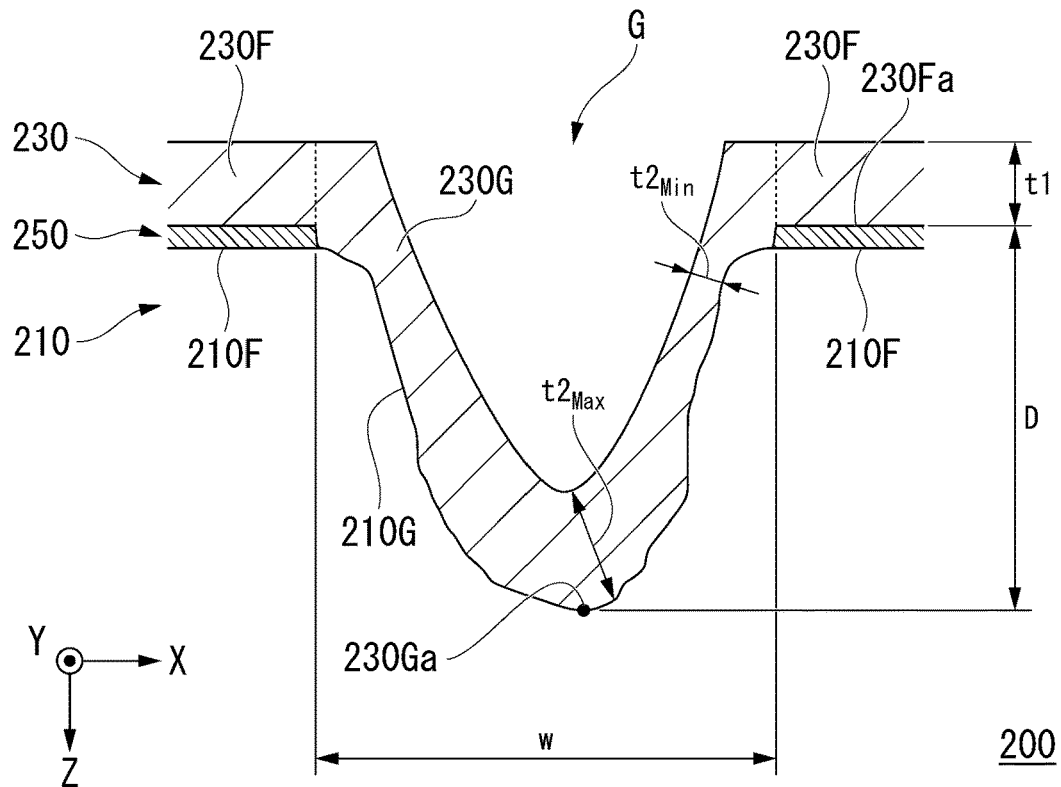
FIG. 3 is a schematic end face view for describing a configuration in the vicinity of a groove of a grain-oriented electrical steel sheet according to a second embodiment.

FIG. 3 is a schematic end face view for describing a configuration in the vicinity of a groove G of the grain-oriented electrical steel sheet 200 according to the present embodiment.

As shown in FIG. 3, the grain-oriented electrical steel sheet 200 according to the present embodiment is configured to include a base steel sheet 210, and a tension coating 230 which is formed on the base steel sheet 210 and contains a compound of phosphoric acid, phosphate, chromic anhydride, chromate, alumina, or silica, and a glass coating 250 formed between the base steel sheet 210 and the tension coating 230 and containing $Mg_2SiO_4$.

In the grain-oriented electrical steel sheet 200 according to the present embodiment, since the glass coating 250 is formed, high adhesion be obtained between the tension coating 230 and the base steel sheet 210, and stronger tension can be applied.

As shown in FIG. 3, the base steel sheet 210 has a flat surface 210F, which is a surface on which the groove G is not formed, and a groove forming surface 210G, which is a surface on which the groove G is formed.

The tension coating 230 is formed on the base steel sheet 210.

In the grain-oriented electrical steel sheet 200 according to the present embodiment, the glass coating 250 is formed between the flat surface 210F of the base steel sheet 210 and the tension coating 230, the glass coating 250 is not formed between the groove forming surface 210G of the base steel sheet 210 and the tension coating 230.

In the following description, in the tension coating 230, a portion formed on the flat surface 210F of the base steel sheet 210 is referred to as a flat surface coating portion 230F, and a portion formed on the groove forming surface 2106 of the base steel sheet 210 is referred to as a groove forming surface coating portion 230G.

Since an average coating thickness t1 of the flat surface coating portion 230F, a minimum coating thickness $t2_{Min}$ of the groove forming surface coating portion 230G and a maximum coating thickness $t2_{Max}$ of the groove forming surface coating portion 230G overlap the average, coating thickness t1, the minimum coating thickness $t2_{Min}$, and the maximum coating thickness $t2_{Max}$ described in the first embodiment, description thereof will be omitted.

In addition, since a width w of the groove forming surface 210G overlaps the width w described in the first embodiment, description thereof will also be omitted.

In the grain-oriented electrical steel sheet 200 according to the present embodiment, the glass coating 250 is formed between the flat surface 210F of the base steel sheet 210 and the tension coating 230. Therefore, a bottom surface position 230Fa of the flat surface coating portion 230F is the boundary between the flat surface coating portion 230F and the glass coating 250.

Here, since an effective depth d is an index for determining a range that effectively contributes to the reduction in iron loss by controlling the thickness of the groove forming surface coating portion 230G, the effective depth d is determined depending on the shape of the tension coating 230 even in a case where the glass coating 250 exists as in the present embodiment. That is, as in the definition described in the first embodiment, in the present embodiment, a value of 0.95 times a distance D in, the sheet thickness direction Z from a bottom surface position 230Ga of the groove forming surface coating portion 230G to, the bottom surface position 230Fa of the flat surface coating portion 230F is the effective depth d.

Therefore, even in the grain-oriented electrical steel sheet 200 according to the present embodiment, the tension coating 230 is formed to satisfy Expressions (1) to (3) as follows. Therefore, an iron loss lower than that of an existing product can be realized while maintaining insulation properties and corrosion resistance.

$$t2_{Min}/t1 \geq 0.4 \quad (1)$$

$$t2_{Max}/t1 \leq 3.0 \quad (2)$$

$$t2_{Max} \leq d/2 \quad (3)$$

A preferable aspect described in the first embodiment is similarly adopted in the grain-oriented electrical steel sheet 200 according to the present embodiment.

In the grain-oriented electrical steel sheet 200 according to the present embodiment, the glass coating 250 is formed only between the flat surface 210F of the base steel sheet 210 and the tension coating 230, and is not formed between the groove forming surface 210G of the base steel sheet 210 and the tension coating 230.

Figure 4:
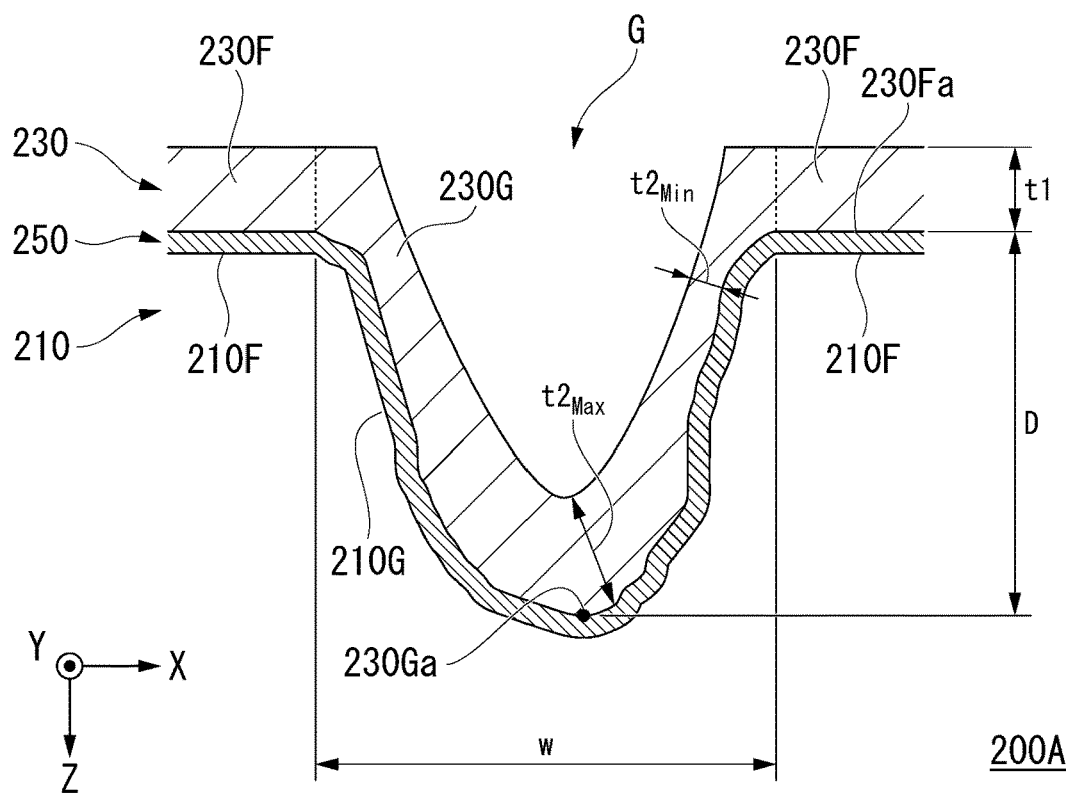
FIG. 4 is a schematic end face view for describing a configuration in the vicinity of a groove of a grain-oriented electrical steel sheet according to a modification example of the second embodiment.

However, as in a grain-oriented electrical steel sheet 200A according to a modification example shown in FIG. 4, the glass coating 250 may also be formed between the groove forming surface 210G of the base steel sheet 210 and the tension coating 230. Even in this case, the definitions of the average coating thickness t1, the minimum coating thickness $t2_{Min}$, the maximum coating thickness $t2_{Max}$, and the effective depth d do not change.

Third Embodiment

Hereinafter, a method for manufacturing a grain-oriented electrical steel sheet according to a third embodiment of the present invention will be described.

The method for manufacturing a grain-oriented electrical steel sheet to the present embodiment includes at least a cold rolling step of manufacturing a cold-rolled steel sheet, a final annealing step of performing, final annealing on the cold-rolled steel sheet, a groove forming step of forming grooves G on the cold-rolled steel sheet before or after the final annealing step, and a tension coating applying step of applying a tension coating onto the grooves G. In addition, a tension coating shaping step of shaping the tension coating by processing the tension coating can also be added.

Furthermore, as an example of a specific manufacturing method, in addition to the above steps, a casting step, a hot rolling step, a hot-rolled steel sheet annealing step, a decarburization annealing step, a nitriding treatment step, and an annealing separating agent applying step are included. These steps are examples adopted to show the feasibility of the present invention, and the present invention is not limited to these steps and conditions.

Figure 5:
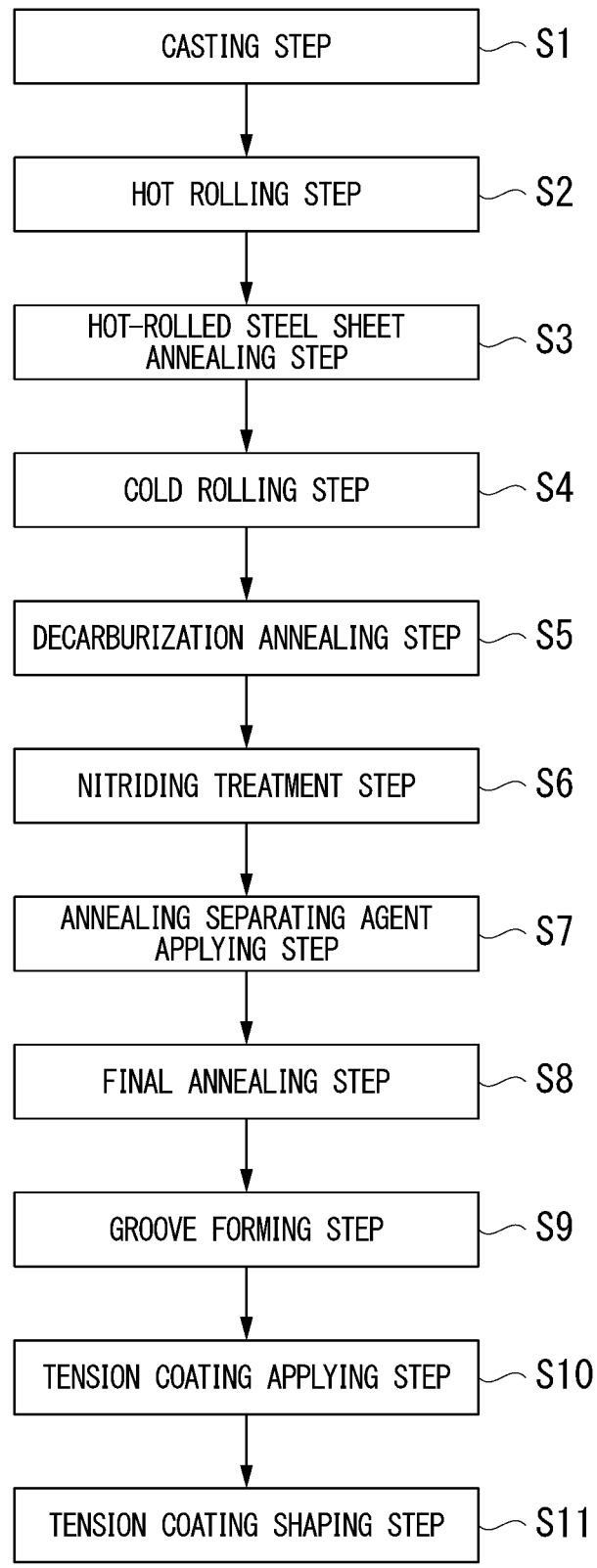
FIG. 5 is a flowchart for describing a method for manufacturing a grain-oriented electrical steel sheet.

FIG. 5 is a flowchart for describing a specific example of the method for manufacturing a grain-oriented electrical steel sheet according to the present embodiment. Hereinafter, each step will be described.

(Casting Step S1)

In a casting step S1, a slab is prepared. An example of a method for manufacturing the slab is as follows. Molten steel is manufactured (melting). A slab is manufactured using the molten steel. The slab may also be manufactured by a continuous casting method. An ingot may be manufactured using the molten steel, and the ingot may be subjected to blooming to manufacture a slab. The thickness of the slab is not particularly limited. The thickness of the slab is, for example, 150 mm to 350 mm. The thickness of the slab is preferably 220 mm to 280 mm. As the slab, a so-called thin slab having a thickness of 10 mm to 70 mm may be used. In a case where the thin slab is used, rough rolling before finish rolling can be omitted in a hot rolling step S2.

The composition of the slab may be any composition that causes secondary recrystallization. Specifically, the base elements and optional, elements of the slab are as follows. The notation of % used for the component means mass %.

Si is an important element for increasing electric resistance and reducing iron loss. When the Si content exceeds 4.8%, the material tends to crack during cold rolling, and rolling cannot be performed. On the other hand, when the amount of Si is lowered, α to γ transformation occurs during final annealing and the directionality of crystals is impaired. Therefore, 0.8%, which does not affect the directionality of crystals during final annealing, may be set as the lower limit.

Although C is an element effective in controlling the primary recrystallization structure in the manufacturing process, an excessive amount of C in the final product has an adverse influence on the magnetic characteristics. Therefore, the C content may be set to 0.085% or less. A preferable upper limit of the C content is 0.075%. C is purified in a decarburization annealing step S5 and a final annealing step S8 described later, and reaches an amount of 0.005% or less after the final annealing step S8. In a case where C is contained, the lower limit of the C content may exceed 0% or may be 0.001% in consideration of productivity in industrial production.

Acid-soluble Al is an element that is bonded to N and functions as an inhibitor as AlN or (Al,Si)N. The range for limiting the amount may be 0.012% to 0.050%, at which the magnetic flux density is increased. When N is added in an amount of 0.01% or more during steelmaking, vacancies called blister are generated in the steel sheet. Therefore, the upper limit may be set to 0.01%. Since N can be contained by nitriding in the middle of the manufacturing process, the lower limit is not specified.

Mn and S precipitate as MnS and serve as inhibitors. When the amount of Mn is less than 0.02% and the amount of S is less than 0.005%, a predetermined amount of effective MnS inhibitor cannot be secured. When the amount of Mn is more than 0.3% and the amount of S is more than 0.04%, solutionizing at the time of heating the slab becomes insufficient, and secondary recrystallization is not stably performed. Therefore, Mn: 0.02% to 0.3% and S: 0.005% to 0.04% may be set.

As other inhibitor constituent, elements, B, Bi, Se, Pb, Sn, Ti, and the like can also be added. The addition amounts thereof may be appropriately adjusted, and may be set to, by mass %, B: 0.080% or less, Bi: 0.010% or less, Se: 0.035% or less, Pb: 0.10% or less, Sn: 0.10% or less, and Ti: 0.015% or less. Since these optional elements may be contained according to a known purpose, it is not necessary to set a lower limit for the amount of the optional elements, and the lower limit may be 0%.

The remainder of the chemical composition of the slab, consists of Fe and impurities. It should be noted that the impurities mentioned here mean elements that are unavoidably incorporated in from components contained in a raw material or components incorporated in a manufacturing process when the slab is industrially manufactured and do not have a substantial influence on the effect of the present invention.

The chemical composition of the slab may contain known optional elements instead of a portion of Fe in consideration of, in addition to solving the manufacturing problems, enhancing the function of inhibitors by the formation of a compound, or an influence on the magnetic characteristics. Examples of the optional elements contained instead of a portion of Fe include the following elements. Each numerical value means an upper limit in a case where those elements are contained as the optional elements.

By mass %, Cu: 0.40% or less, P: 0.50% or less. Sb: 0.10% or less, Cr: 0.30% or less, and Ni: 1.00% or less.

Since these optional elements may be contained according to a known purpose, it is not necessary to set a lower limit for the amount of the optional elements, and the lower limit may be 0%.

(Hot Rolling Step S2)

The hot rolling step S2 is a step of performing hot rolling on the slab heated to a predetermined temperature (for example, 1100° C. to 1400° C.) to obtain a hot-rolled steel sheet. As an example, the slab having the above-mentioned composition may be subjected to hot rolling after being heated to a temperature of 1100° C. or higher from the viewpoint of securing a temperature for hot rolling and 1280° C. or lower at which solutionizing of AlN is incompletely achieved, based on a manufacturing method using (Al,Si)N as an inhibitor as described in Patent Document 3. Alternatively, based on a manufacturing method using AlN and MnS as main inhibitors as described in Patent Document 4, hot rolling may be performed after heating at a temperature of 1300° C. or higher at which solutionizing is completely achieved.

(Hot-Rolled Steel Sheet Annealing Step S3)

A hot-rolled steel sheet annealing step S3 is a step of annealing the hot-rolled steel sheet obtained in the hot rolling step S2 immediately or in a short period of time to obtain an annealed steel sheet. The annealing is performed in a temperature range of 750° C. to 1200° C. for 30 seconds to 30 minutes. This annealing is effective for enhancing the magnetic characteristics of the product.

(Cold Rolling Step S4)

A cold rolling step S4 is a step of performing cold rolling (for example, with a total cold-rolling reduction of 80% to 95%) once or a plurality of (two or more) times with annealing (process annealing) on the annealed steel sheet obtained in the hot-rolled steel sheet annealing step S3 to obtain a cold-rolled steel sheet.

The thickness of the cold-rolled steel sheet may be 0.10 mm to 0.50 mm.

(Decarburization Annealing Step S5)

The decarburization annealing step S5 is a step of performing decarburization annealing on the cold-rolled steel sheet obtained in the cold rolling step S4 to obtain a decarburization-annealed steel sheet in which primary recrystallization has occurred. The decarburization annealing may be performed, for example, at 700° C. to 900° C. for 1 to 3 minutes.

By performing the decarburization annealing, C contained in the cold-rolled steel sheet is removed. The decarburization annealing is preferably performed in a moist atmosphere in order to remove "C" contained in the cold-rolled steel sheet.

(Nitriding Treatment Step S6)

A nitriding treatment step S6 is a step performed as necessary in order to adjust the strength of the inhibitor in the secondary recrystallization. The nitriding, treatment increases the amount of nitrogen in the steel sheet by about 40 ppm to 200 ppm from the start of the decarburization treatment to the start of the secondary recrystallization in the final annealing. Examples of the nitriding treatment include a treatment of performing annealing in an atmosphere containing a gas having a nitriding ability, such as ammonia, and a treatment of applying an annealing separating agent containing a powder having a nitriding ability, such as MnN, in an annealing separating agent applying step S7 described later.

(Annealing Separating Agent Applying Step S7)

The annealing separating agent applying step S7 is a step of applying the annealing separating agent to the decarburization-annealed steel sheet. As the annealing separating agent, for example, an annealing separating agent primarily containing alumina ($Al_2O_3$) can be used. The decarburization-annealed steel sheet after applying the annealing separating agent is subjected to final annealing in the subsequent final annealing step S8 in a state of being wound into a coil shape.

In a case where a glass coating is formed, an annealing separating agent primarily containing magnesia (MgO) is used.

(Final Annealing Step S8)

The final annealing step S8 is a step of performing final annealing on the decarburization-annealed steel sheet to which the annealing separating agent is applied to incur secondary recrystallization. In the final annealing step S8 with this secondary recrystallization, secondary recrystallization is allowed to proceed in a state in which the growth of primary recrystallized grains is suppressed by the inhibitor, whereby grains with the {100}<001> orientation are preferentially grown and the magnetic flux density is dramatically improved.

In a case where magnesia (MgO) is applied in the above annealing separating agent applying step S7, a glass coating containing $Mg_2SiO_4$ is formed in the final annealing step S8.

(Groove Forming Step S9)

A groove forming step S9 is a step of forming grooves G on the cold-rolled steel sheet after the cold rolling step S4 for the purpose of magnetic domain control (magnetic domain refinement). The grooves G can be formed by a known method such as a laser, an electron beam, plasma, a mechanical method, or etching.

The groove forming step S9 is performed after the final annealing step S8 in the example shown in the flowchart of FIG. 5. However, when the groove forming step S9 is performed on the steel sheet that has undergone the cold rolling step S4, the cross-sectional shape of a linear groove ideal for the magnetic domain refinement can be maintained. Therefore, the groove forming step S9 may be performed before or after the final annealing step S8. Alternatively, the groove forming step S9 may be before or after the tension coating applying step S10.

For example, the grooves G may be formed at any time from after the cold rolling step S4 to before a tension coating shaping step S11.

The tension coating may be formed in advance on the surface of the steel sheet at a time after the final annealing step S8 and before the groove forming step S9. In this case, in the groove forming step S9, the tension coating at a portion on the groove G is reduced or disappears. Therefore, in a case where the tension coating is formed on the surface of the steel sheet in advance after the final annealing step S8 and before the groove forming step S9, the tension coating applying step S10 is performed at a time after the groove forming step S9.

In a case where the final annealing step S8 is performed in a state in which magnesia (MgO) is applied in the annealing separating agent applying step S7, the morphology of the glass coating formed at the time of the groove forming step S9 is different.

In a case where the groove forming step S9 is performed after the final annealing step S8, the grooves G are formed after the glass coating is formed. Therefore, as shown in FIG. 3 described in the second embodiment, the glass coating is not formed on the grooves G.

In a case where the groove forming step S9 is performed before the final annealing step S8, the glass coating is formed after the grooves G are formed. Therefore, as shown in FIG. 4 described as a modification example in the second embodiment, the glass coating is also formed on the grooves G.

(Tension Coating Applying Step S10)

The tension coating applying step S10 is a step of applying the tension coating made of a phosphoric acid compound or the like by applying and baking a coating solution. The coating solution is, for example, a coating solution containing phosphoric acid or phosphate, chromic anhydride or chromate, alumina or colloidal silica, and the like. The baking may be performed, for example, under the conditions at 350° C. to 1150° C. for 5 seconds to 300 seconds.

Here, a tension coating satisfying the present invention is formed by appropriately controlling the thickness of the coating of the groove part by changing conditions such as the viscosity or concentration of the coating solution to be applied, the morphology of a roll for the application, the time from the application to the baking, and air blowing for removing a portion, of the coating solution. In a case where the tension coating satisfying the present invention is formed, the tension coating, shaping step S11 is not required.

(Tension Coating Shaping Step S11)

The tension coating shaping step S11 is a step of shaping the tension coating by changing the thickness of a portion of the tension coating formed on, the groove G in a range narrower than the width of the groove G.

More specifically, in the tension coating shaping step S11, the tension coating is shaped by processing the tension coating to reduce the thickness of the portion of the tension coating formed on the groove G in a range narrower than the width of the groove G and leave a part of the tension coating. The processing is not limited to processing in which the thickness of the tension coating formed on the groove G is reduced as a whole, and for example, may be processing in which the thickness of a part of the tension coating formed on the groove G is reduced while the thickness of part thereof is increased.

In the tension coating applying step S10 described above, since the coating solution flows into the grooves G formed in the groove forming step S9, baking is performed in a state in which a large amount of the coating solution is accumulated in the grooves G. Therefore, there are cases where the thickness of the coating on the groove G is larger than the thickness of the flat surface on which the groove G is not formed.

Control of the thickness of the coating formed on the groove wall surface can be performed, as described above, by changing conditions such as the concentration of the coating solution to be applied, the morphology of a roll for the application, the time from the application to the baking, and air blowing for removing a portion of the coating solution, in the tension coating applying step S10. However, considering the ease of the coating operation, the formation state of fine grooves G, and the free and precise control of the thickness of the coating formed on the groove G, in the tension coating applying step S10 it is preferable that the coating solution is applied without being aware of the presence of the grooves G and without any special control, baking is performed in a state in which the coating solution is accumulated in the groove G, and the coating formed on the groove G to be thicker than the coating of the flat surface is processed to a desired thickness in a subsequent step.

Therefore, in the tension coating shaping step S11, by processing or removing a coating through laser or electron beam irradiation performed on the groove G, the thickness of the thick coating formed on the groove G is reduced and left, so that the iron loss can be further reduced.

A method for processing the tension coating is not particularly limited as long as the thickness of the tension coating can be controlled so as to satisfy Expressions (1) to (3) described in the first embodiment. For example, a known method such as a laser, an electron beam, plasma, a mechanical method, or etching can be used. In a case where these methods are adopted, the surface of the tension coating becomes smooth and the film tension becomes constant, which leads to an advantage such as a reduction in eddy-current loss.

In a case where a laser or beam is used, the diameter of the laser or beam to be irradiated is set to be smaller than the width of the groove G. Since a part of the coating has to be left to maintain the insulation properties and corrosion resistance, the power of the laser or beam is appropriately adjusted according to the thickness of the coating and the width of the groove G. This control is not so difficult for those skilled in the art who routinely process the surface of the steel sheet by laser or beam irradiation. The power of the laser or beam is adjusted in a range of, for example, 50 W to 2000 W. This is because the coating is hardly removed at 50 W or lower, and the coating is completely fractured at 2000 W or higher.

EXAMPLES

Example 1

Example 1 shows that in a case where the coating thickness is appropriately controlled, the iron loss is reduced and the insulation properties and corrosion resistance are maintained.

Based on the above steps (the casting step S1, the hot rolling step S2, the hot-rolled steel sheet annealing step S3, and the cold rolling step S4), a cold-rolled steel sheet having a sheet thickness of 0.23 mm was produced. The composition ratio of a silicon steel slab includes, by mass %, Si: 3.3%, Mn: 0.1%, S: 0.007%, acid-soluble Al: 0.03%, N: 0.008%, Sn: 0.06%, and a remainder consisting of Fe and impurities.

On the cold-rolled steel sheet, grooves having a width of 50 μm were formed by a photoetching method at a rolling direction pitch of 5 mm in a direction of 10 degrees from a direction perpendicular to the rolling direction X (a direction of 80° with respect to the rolling direction X) immediately after the cold rolling step S4 in Experiment Nos. 1 to 14 and after the final annealing step S8 in Experiment Nos. 15 to 21.

The depth of the groove was set to 20 μm.

An annealing separating agent was applied to these steel sheets with a water slurry before the final annealing step S8. As the annealing separating agent, alumina ($Al_2O_3$) was used in Experiment Nos. 1 to 7, and magnesia (MgO) was used as in Experiment Nos. 8 to 21.

Thereafter, a coating solution primarily containing colloidal silica and phosphate was applied and baked at 850° C. for 2 minutes to forma tension coating.

The grooves of these steel sheets were irradiated with a semiconductor laser while changing the beam diameter and irradiation power of the laser to remove a part of the tension coating formed on the grooves.

After the laser irradiation, the morphology was observed with a scanning electron microscope, and t1, $t2_{Min}$, and $t2_{Max}$ were measured.

The iron loss W17/50 (W/kg) of the obtained product is shown in Tables 1 and 2.

The iron loss of Experiment No. 1 with no irradiation is 0.79, and this was considered as a reference. A case of an iron loss of 0.75 or less was determined as improvement in iron loss and evaluated as "Good", and a case of an iron loss of more than 0.75 was determined as no improvement in iron loss and evaluated as "NG".

For the evaluation of insulation properties, the interlayer resistance was measured by a method according, to JIS C 2550-4 (2011).

An interlayer resistance of 25 Ωcm² or more was evaluated as "Very Good" because it was considered that sufficient insulation properties are maintained.

An interlayer resistance of 5 to 25 Ωcm² was evaluated as "Good" because it was considered that insulation properties are maintained.

Those with an interlayer resistance of less than 5 Ωcm² were evaluated as "NG".

For the evaluation of corrosion resistance, the steel sheet was held in air at a temperature of 50° C. and a dew point of 50° C. for 200 hours, and then the surface of the steel sheet was visually observed.

Those without rust were considered to have corrosion resistance and are displayed as "Good".

Those with rust are displayed as "NG".

TABLE 1

| No. | D [μm] | d [μm] | d/2 [μm] | Glass coating | Laser diameter [μm] | Irradiation power [W] | t1 [μm] | $t2_{Min}$ [μm] |
|---|---|---|---|---|---|---|---|---|
| 1 | 20.0 | 19.0 | 9.5 | Absent | 0 | 0 | 3 | 18 |
| 2 | 20.0 | 19.0 | 9.5 | Absent | 20 | 300 | 3 | 2 |
| 3 | 20.0 | 19.0 | 9.5 | Absent | 40 | 300 | 3 | 6 |
| 4 | 20.0 | 19.0 | 9.5 | Absent | 60 | 300 | 3 | 0 |
| 5 | 20.0 | 19.0 | 9.5 | Absent | 40 | 600 | 3 | 0 |
| 6 | 20.0 | 19.0 | 9.5 | Absent | 40 | 50 | 3 | 17 |
| 7 | 20.0 | 19.0 | 9.5 | Absent | 60 | 900 | 3 | 0 |

| No. | $t2_{Min}/t1$ | $t2_{Max}$ [μm] | $t2_{Max}/t1$ | Iron loss [W/kg] | Iron loss evaluation | Insulation properties | Corrosion resistance | Classification |
|---|---|---|---|---|---|---|---|---|
| 1 | 6.0 | 20 | 6.7 | 0.79 | NG | Very Good | Good | Comparative Example |
| 2 | 0.7 | 4 | 1.3 | 0.73 | Good | Very Good | Good | Invention Example |
| 3 | 2.0 | 9 | 3.0 | 0.74 | Good | Very Good | Good | Invention Example |
| 4 | 0.0 | 16 | 5.3 | 0.78 | NG | NG | NG | Comparative Example |
| 5 | 0.0 | 0 | 0.0 | 0.73 | Good | NG | NG | Comparative Example |
| 6 | 5.7 | 20 | 6.7 | 0.79 | NG | Very Good | Good | Comparative Example |
| 7 | 0.0 | 7 | 2.3 | 0.75 | Good | NG | NG | Comparative Example |

As shown in Table 1, compared to Experiment No. 1 in which no laser irradiation was performed, in Experiment Nos. 2 and 3 in which laser irradiation was performed on the grooves at a certain power or more, the iron loss was reduced and it can be seen that there was an improvement of about 7% in the iron loss value in the method of the present invention from an existing method.

In a case where laser irradiation was performed to be wider than the width of the grooves as in Experiment Nos. 4 and 7, an increase in the irradiation power causes a sufficient decrease in the thickness of the coating, and thus the iron loss became smaller than that in Experiment No. 1. However, since the coating around the groove was simultaneously removed, the insulation properties and the corrosion resistance cannot be maintained. Contrary to this, in both Experiment Nos. 2 and 3 according to the present invention, the coating thickness was appropriately controlled, so that the iron loss was reduced and the insulation properties and the corrosion resistance were maintained.

In Experiment No. 5 in which the irradiation power was excessive, the coating was completely removed, and the insulation properties and the corrosion resistance cannot be maintained.

In Experiment No. 6 in which the irradiation power as insufficient, the coating was not removed and the iron loss reduction effect could not be obtained.

TABLE 2

| No. | D [μm] | d [μm] | d/2 [μm] | Glass coating | Laser diameter [μm] | Irradiation power [W] | t1 [μm] | $t2_{Min}$ [μm] |
|---|---|---|---|---|---|---|---|---|
| 8 | 20.0 | 19.0 | 9.5 | Present (flat + groove) | 40 | 50 | 3 | 15 |

TABLE 2-continued

| No. | | | | | | | |
|---|---|---|---|---|---|---|---|
| 9 | 20.0 | 19.0 | 9.5 | Present (flat + groove) | 40 | 200 | 3 | 6 |
| 10 | 20.0 | 19.0 | 9.5 | Present (flat + groove) | 40 | 250 | 3 | 4 |
| 11 | 20.0 | 19.0 | 9.5 | Present (flat + groove) | 40 | 300 | 3 | 3 |
| 12 | 20.0 | 19.0 | 9.5 | Present (flat + groove) | 40 | 350 | 3 | 2 |
| 13 | 20.0 | 19.0 | 9.5 | Present (flat + groove) | 40 | 400 | 3 | 1 |
| 14 | 20.0 | 19.0 | 9.5 | Present (flat + groove) | 40 | 500 | 3 | 0 |
| 15 | 20.0 | 19.0 | 9.5 | Present (flat) | 40 | 50 | 3 | 15 |
| 16 | 20.0 | 19.0 | 9.5 | Present (flat) | 40 | 200 | 3 | 6 |
| 17 | 20.0 | 19.0 | 9.5 | Present (flat) | 40 | 250 | 3 | 4 |
| 18 | 20.0 | 19.0 | 9.5 | Present (flat) | 40 | 300 | 3 | 3 |
| 19 | 20.0 | 19.0 | 9.5 | Present (flat) | 40 | 350 | 3 | 2 |
| 20 | 20.0 | 19.0 | 9.5 | Present (flat) | 40 | 400 | 3 | 1 |
| 21 | 20.0 | 19.0 | 9.5 | Present (flat) | 40 | 450 | 3 | 0 |

| No. | $t2_{Min}/t1$ | $t2_{Max}$ [μm] | $t2_{Max}/t1$ | Iron loss [W/kg] | Iron loss evaluation | Insulation properties | Corrosion resistance | Note |
|---|---|---|---|---|---|---|---|---|
| 8 | 5.0 | 18 | 6.0 | 0.79 | NG | Very Good | Good | Comparative Example |
| 9 | 2.0 | 8 | 2.7 | 0.73 | Good | Very Good | Good | Invention Example |
| 10 | 1.3 | 6 | 2.0 | 0.73 | Good | Very Good | Good | Invention Example |
| 11 | 1.0 | 6 | 2.0 | 0.72 | Good | Very Good | Good | Invention Example |
| 12 | 0.7 | 5 | 1.7 | 0.71 | Good | Good | Good | Invention Example |
| 13 | 0.3 | 5 | 1.7 | 0.70 | Good | NG | NG | Comparative Example |
| 14 | 0.0 | 3 | 1.0 | 0.70 | Good | NG | NG | Comparative Example |
| 15 | 5.0 | 18 | 6.0 | 0.80 | NG | Very Good | Good | Comparative Example |
| 16 | 2.0 | 9 | 3.0 | 0.75 | Good | Very Good | Good | Invention Example |
| 17 | 1.3 | 7 | 2.3 | 0.74 | Good | Very Good | Good | Invention Example |
| 18 | 1.0 | 6 | 2.0 | 0.72 | Good | Very Good | Good | Invention Example |
| 19 | 0.7 | 6 | 2.0 | 0.71 | Good | Good | Good | Invention Example |
| 20 | 0.3 | 5 | 1.7 | 0.70 | Good | NG | NG | Comparative Example |
| 21 | 0.0 | 4 | 1.3 | 0.70 | Good | NG | NG | Comparative Example |

As shown in Table 2, in Experiment Nos. 8 and 15, since there were points where the coating of the groove forming surface coating portion was excessively thick with respect to the average coating thickness t1, the tension generated in the direction intersecting the surface direction of the steel sheet due to the coating formed on the groove wall surface was excessive, and the iron loss reduction effect could not be obtained.

In addition, in Experiment Nos. 13, 14, 20, and 21, since there were points where the coating of the groove forming surface coating portion was excessively thin with respect to the average coating thickness t1, excellent insulation properties and corrosion resistance could not be obtained.

Contrary to this, in all of Experiment Nos. 9 to 12 and 16 to 19 in which the coating thickness was appropriately controlled, the iron loss was reduced and insulation properties and corrosion resistance were maintained.

Example 2

Example 2 shows that the greater the depth of the groove and the coating thickness, the greater the tension in the groove, and the more the iron loss reduction effect due to the formation of the grooves can be reduced.

A cold-rolled steel sheet having a sheet thickness of 0.23 mm as produced by the same procedure as in Example 1.

On the cold-rolled steel sheet, grooves having a width of 50 μm were formed by a photoetching method at a rolling direction pitch of 5 mm in a direction of 10 degrees from a direction perpendicular to the rolling; direction X (a direction of 80° with respect to the rolling direction X) immediately after the cold rolling step S4.

The depth of the groove was set to 10 μm in Experiment Nos. 22 to 24, 20 μm in Experiment Nos. 25 to 27, and 30 μm in Experiment Nos. 28 to 31.

Alumina ($Al_2O_3$) as an annealing separating agent was applied to these steel sheets with a water slurry, and then final annealing was performed. Thereafter, a coating solution primarily containing colloidal silica and phosphate was applied and baked at 850° C. for 2 minutes to form a tension coating. At this time, the thickness of the coating was changed by changing the application amount of the coating solution.

In Experiment Nos. 23, 24, 26, 27, 30, and 31, laser irradiation was performed to remove a part of the tension coating in the groove by setting the beam diameter of the semiconductor laser for the grooves of the steel sheet to 40 μm and adjusting the irradiation power so that a coating having conditions satisfying $t2_{Max} \leq w \times t1/d$ can be obtained.

In addition, after the laser irradiation, the morphology was observed with a scanning electron microscope, and t1, $t2_{Min}$, and $t2_{Max}$ were measured.

The iron loss W17/50 (W/kg) of the obtained product is shown in Tables 3 to 5.

For Experiment Nos. 22 to 24 with D=10 μm, a case where the iron loss was 0.77 or less was evaluated as "Good", and a case where the iron loss exceeded 0.77 was evaluated as "NG".

For Experiment Nos. 25 to 27 with D=20 μm, a case where the iron loss was 0.75 or less was evaluated as "Good", and a case where the iron loss exceeded 0.75 was evaluated as "NG".

For Experiment Nos. 28 to 31 with D=30 μm, a case where the iron loss as 0.74 or less was evaluated as "Good", and a case where the iron loss exceeded 0.74 was evaluated as "NG".

For the evaluation of the insulation properties, the interlayer resistance was measured by a method according to JIS C 2550-4 (2011) in the same manner as in Example 1. The evaluation criteria are the same as in Example 1.

TABLE 3

| No. | D [μm] | d [μm] | d/2 [μm] | Glass coating | Laser diameter [μm] | Irradiation power [W] | t1 [μm] | $t2_{Min}$ [μm] |
|---|---|---|---|---|---|---|---|---|
| 22 | 10 | 9.5 | 4.8 | Absent | 0 | 0 | 3 | 9 |
| 23 | 10 | 9.5 | 4.8 | Absent | 40 | 300 | 3 | 2 |
| 24 | 10 | 9.5 | 4.8 | Absent | 40 | 350 | 5 | 2 |

| No. | $t2_{Min}$/t1 | $t2_{Max}$ [μm] | $t2_{Max}$/t1 | Iron loss [W/kg] | Iron loss evaluation | Insulation properties | Corrosion resistance | Note |
|---|---|---|---|---|---|---|---|---|
| 22 | 3.0 | 10 | 3.3 | 0.81 | NG | Very Good | Good | Comparative Example |
| 23 | 0.7 | 4 | 1.3 | 0.77 | Good | Good | Good | Invention Example |
| 24 | 0.4 | 3 | 0.6 | 0.75 | Good | Very Good | Good | Invention Example |

TABLE 4

| No. | D [μm] | d [μm] | d/2 [μm] | Glass coating | Laser diameter [μm] | Irradiation power [W] | t1 [μm] | $t2_{Min}$ [μm] |
|---|---|---|---|---|---|---|---|---|
| 25 | 20 | 19.0 | 9.5 | Absent | 0 | 0 | 3 | 18 |
| 26 | 20 | 19.0 | 9.5 | Absent | 40 | 300 | 3 | 2 |
| 27 | 20 | 19.0 | 9.5 | Absent | 40 | 350 | 5 | 2 |

| No. | $t2_{Min}$/t1 | $t2_{Max}$ [μm] | $t2_{Max}$/t1 | Iron loss [W/kg] | Iron loss evaluation | Insulation properties | Corrosion resistance | Note |
|---|---|---|---|---|---|---|---|---|
| 25 | 6.0 | 20 | 6.7 | 0.79 | NG | Very Good | Good | Comparative Example |
| 26 | 0.7 | 4 | 1.3 | 0.73 | Good | Good | Good | Invention Example |
| 27 | 0.4 | 6 | 1.2 | 0.71 | Good | Very Good | Good | Invention Example |

TABLE 5

| No. | D [μm] | d [μm] | d/2 [μm] | Glass coating | Laser diameter [μm] | Irradiation power [W] | t1 [μm] | $t2_{Min}$ [μm] |
|---|---|---|---|---|---|---|---|---|
| 28 | 30 | 28.5 | 14.3 | Absent | 0 | 0 | 3 | 24 |
| 29 | 30 | 28.5 | 14.3 | Absent | 0 | 0 | 5 | 26 |
| 30 | 30 | 28.5 | 14.3 | Absent | 40 | 300 | 3 | 2 |
| 31 | 30 | 28.5 | 14.3 | Absent | 40 | 350 | 5 | 2 |

| No. | $t2_{Min}$/t1 | $t2_{Max}$ [μm] | $t2_{Max}$/t1 | Iron loss [W/kg] | Iron loss evaluation | Insulation properties | Corrosion resistance | Note |
|---|---|---|---|---|---|---|---|---|
| 28 | 8.0 | 27 | 9.0 | 0.77 | NG | Very Good | Good | Comparative Example |
| 29 | 5.2 | 30 | 6.0 | 0.76 | NG | Very Good | Good | Comparative Example |
| 30 | 0.7 | 4 | 1.3 | 0.71 | Good | Good | Good | Invention Example |
| 31 | 0.4 | 5 | 1.0 | 0.68 | Good | Good | Good | Invention Example |

As shown in Table 3, in a case where the groove depth was 10 μm, Nos. 23 and 24 in which the coating of the groove was removed showed improved iron loss compared to No. 22 in which the coating of the groove was not removed.

As shown in Table 4, in a case where the groove depth was 20 μm, Nos. 26 and 27 in which the coating of the groove was removed showed improved iron loss compared to No. 25 in which the coating of the groove was not removed.

As shown in Table 5, in a case where the groove depth was 30 μm, the difference in iron loss is small in a case where the coating of the groove was not removed as in Nos. 28 and 29 even in a case where the coating thickness is different. However, in a case where the coating of the groove was removed, the iron loss reduction effect was obtained when the coating thickness was large as in Nos. 30 and 31.

In addition, when a change in iron loss from No. 22 to No. 23 having the same coating thickness, a change in iron loss from No. 25 to No. 26, and a change in iron loss from No. 28 to No. 30 were compared to each other, the greater the depth of the groove, the greater the iron loss reduction effect.

This is because the greater the depth of the groove and the coating thickness, the greater the contribution of tension to the groove, and the more the iron loss reduction effect due to the formation of the grooves can be reduced.

Examples 3

In Examples 1 and 2 described above, the coating was appropriately shaped by the laser irradiation. However, when the coating was already formed into an appropriate thickness by adjusting the viscosity or concentration of the coating solution to be applied, shaping of the coating by laser irradiation or the like is not necessary.

Therefore, Experimental Example 3 shows that the effect of the present invention can be obtained by appropriately adjusting the coating thickness without removing the coating of the groove.

A cold-rolled steel sheet having a sheet thickness of 0.23 mm as produced by the same procedure as in Examples 1 and 2.

On the cold-rolled steel sheet, grooves having a width of 50 μm were formed by a photoetching method at a rolling direction pitch of 5 mm in a direction of 10 degrees from a direction perpendicular to the rolling; direction X (a direction of 80° with respect to the rolling direction X) immediately, after the cold rolling step S4.

The depth of the groove was set to 20 μm.

Alumina ($Al_2O_3$) as an annealing separating agent was applied to these steel sheets with a water slurry, and then final annealing was performed. Thereafter, a coating solution primarily containing colloidal silica and phosphate was applied and baked for 2 minutes to form a tension coating. At this time, in each of Experiment Nos. 32 to 35, the temperature of the coating solution and the baking temperature were adjusted to the conditions shown in Table 6 to change the thickness of the coaling.

In Experiment Nos. 32 to 35, the morphology of the coating was observed with a scanning electron microscope, and t1, $t2_{Min}$, and $t2_{Max}$ were measured.

The iron loss W17/50 (W/kg) of the obtained product is shown in Table 6.

The iron loss of Experiment No. 32 is 0.77, and this was considered as a reference. A case of an iron loss of 0.75 or less was determined as improvement in iron loss and evaluated as "Good", and a case of an iron loss of more than 0.75 was determined as no improvement in iron loss and evaluated as "NG".

For the evaluation of the insulation properties, the interlayer resistance was measured by a method according to JIS C 2550-4 (2011) in the same manner as in Example 1. The evaluation criteria are the same as in Example 1.

TABLE 6

| No. | D [μm] | d [μm] | d/2 [μm] | Glass coating | Coating solution temperature [° C.] | Baking temperature | t1 [μm] | $t2_{Min}$ [μm] |
|---|---|---|---|---|---|---|---|---|
| 32 | 20 | 19.0 | 9.5 | Absent | 25 | 500 | 3 | 15 |
| 33 | 20 | 19.0 | 9.5 | Absent | 25 | 1100 | 3 | 14 |

TABLE 6-continued

| 34 | 20 | 19.0 | 9.5 | Absent | 0 | 500 | 3 | 7 |
|----|----|------|-----|--------|---|-----|---|---|
| 35 | 20 | 19.0 | 9.5 | Absent | 0 | 1100 | 3 | 4 |

| No. | $t2_{Min}/t1$ | $t2_{Max}$ [µm] | $t2_{Max}/t1$ | Iron loss [W/kg] | Iron loss evaluation | Insulation properties | Corrosion resistance | Note |
|---|---|---|---|---|---|---|---|---|
| 32 | 5.0 | 17 | 5.7 | 0.77 | NG | Very Good | Good | Comparative Example |
| 33 | 4.7 | 16 | 5.3 | 0.76 | NG | Very Good | Good | Comparative Example |
| 34 | 2.3 | 12 | 4.0 | 0.76 | NG | Very Good | Good | Comparative Example |
| 35 | 1.3 | 8 | 2.7 | 0.75 | Good | Good | Good | Invention Example |

As shown in Table 6, in Experiment Nos. 32 to 34, the effect of the present invention could not be obtained because the coating thickness was not appropriate.

On the other hand, in Experiment No. 35, it was confirmed that the effect of the present invention was obtained by adjusting the coating thickness without removing the coating of the groove.

INDUSTRIAL APPLICABILITY

According to the present invention, it is possible to provide a grain-oriented electrical steel sheet having a lower iron loss than that of an existing product while maintaining insulation properties and corrosion resistance.

BRIEF DESCRIPTION OF THE REFERENCE SYMBOLS 100, 200, 200A Grain-oriented electrical steel sheet
110, 210 Base steel sheet
110F, 210F Flat surface
110G, 210E Groove forming surface
130, 230 Tension coating
130F, 230F Flat surface coating portion
130G, 230G Groove forming surface coating portion
130Fa, 230Fa Bottom surface position of flat surface coating portion
130Ga, 230Ga Bottom surface position of groove forming surface coating portion
250 Glass coating

The invention claimed is:

1. A grain-oriented electrical steel sheet comprising:
a base steel sheet having a flat surface and a groove forming surface on which a groove is formed;
a tension coating formed on the base steel sheet and containing a compound of phosphoric acid, phosphate, chromic anhydride, chromate, alumina, or silica,
wherein the tension coating has a flat surface coating portion formed on the flat surface and a groove forming surface coating portion formed on the groove forming surface; and
a glass coating formed between the flat surface and flat surface coating portion and not formed between the groove forming surface and the groove forming surface coating portion,
wherein an average coating thickness of the flat surface coating portion is referred to as t1 (µm), a minimum coating thickness of the groove forming surface coating portion is referred to as $t2_{Min}$ (µm), and a maximum coating thickness of the groove forming surface coating portion is referred to as t2Max (µm), such that Expressions (1) and (2) are satisfied,
wherein a value of 0.95 times a distance D of the tension coating along a sheet thickness direction from a bottom surface position of the groove forming surface coating portion to a bottom surface position of the flat surface coating portion is referred to as an effective depth d (µm), such that Expression (3) is satisfied, $$t2_{Min}/t1 \geq 0.4 \qquad (1)$$

$$t2_{Max}/t1 \leq 3.0 \qquad (2)$$

$$t2_{Max} \leq d/2 \qquad (3),$$

wherein $t2_{Min}$ is a minimum value of the thickness of the groove forming surface coating portion in a direction perpendicular to the groove forming surface, and
wherein $t2_{Max}$ is a maximum value of the thickness of the groove forming surface coating portion in a direction perpendicular to the groove forming surface.

2. The grain-oriented electrical steel sheet according to claim 1,
wherein the glass coating contains $Mg_2SiO_4$.

3. The grain-oriented electrical steel sheet according to claim 1,
wherein a width of the groove forming surface is referred to as w (µm), such that Expression (4) is satisfied, $$d/w \geq 1/3 \qquad (4).$$

4. The grain-oriented electrical steel sheet according to claim 1,
wherein a width of the groove forming surface is referred to as w (µm), such that Expression (5) is satisfied, $$(d/w) \times t2_{Max} \leq t1 \qquad (5).$$

5. A method for manufacturing the grain-oriented electrical steel sheet according to claim 1, comprising:
a cold rolling step of manufacturing a cold-rolled base steel sheet;
a final annealing step of performing final annealing with secondary recrystallization on the cold-rolled base steel sheet;
a linear groove forming step of forming the groove on the cold-rolled base steel sheet before or after the final annealing step, the groove being linear in a direction intersecting a rolling direction of the cold-rolled base steel sheet; and
a tension coating applying step of forming the tension coating on the groove.

6. The method according to claim 5, further comprising:
after the tension coating applying step, a tension coating shaping step of shaping the tension coating by processing the tension coating to leave a part of the tension coating in a thickness direction and reduce a thickness of a portion of the tension coating formed on the groove in a range narrower than a width of the groove.

7. The method according to claim 5, further comprising:
an annealing separating agent applying step of applying an annealing separating agent to the cold-rolled base steel sheet after the cold rolling step and before the final annealing step,
wherein the annealing separating agent contains magnesia.

8. A method for manufacturing the grain-oriented electrical steel sheet according to claim 2, comprising:
a cold rolling step of manufacturing the base steel sheet;
a final annealing step of performing final annealing with secondary recrystallization on the cold-rolled base steel sheet;
a linear groove forming step of forming the groove on the cold-rolled base steel sheet before or after the final annealing step, the groove being linear in a direction intersecting a rolling direction of the cold-rolled base steel sheet; and
a tension coating applying step of forming the tension coating on the groove.

9. A method for manufacturing the grain-oriented electrical steel sheet according to claim 3, comprising:
a cold rolling step of manufacturing the base steel sheet;
a final annealing step of performing final annealing with secondary recrystallization on the cold-rolled base steel sheet;
a linear groove forming step of forming the groove on the cold-rolled base steel sheet before or after the final annealing step, the groove being linear in a direction intersecting a rolling direction of the cold-rolled base steel sheet; and
a tension coating applying step of forming the tension coating on the groove.

10. A method for manufacturing the grain-oriented electrical steel sheet according to claim 4, comprising:
a cold rolling step of manufacturing the base steel sheet;
a final annealing step of performing final annealing with secondary recrystallization on the cold-rolled base steel sheet;
a linear groove forming step of forming the groove on the cold-rolled base steel sheet before or after the final annealing step, the groove being linear in a direction intersecting a rolling direction of the cold-rolled base steel sheet; and
a tension coating applying step of forming the tension coating on the groove.

11. A grain-oriented electrical steel sheet comprising:
a base steel sheet having a flat surface and a groove forming surface on which a plurality of at least n grooves is formed; and
a tension coating formed on the base steel sheet and containing a compound of phosphoric acid, phosphate, chromic anhydride, chromate, alumina, or silica,
wherein the tension coating has a flat surface coating portion formed on the flat surface and a groove forming surface coating portion formed on the groove forming surface,
wherein an average coating thickness of the flat surface coating portion is referred to as t1 (µm), a minimum coating thickness of the groove forming surface coating portion is referred to as $t2_{Min}$ (µm), and a maximum coating thickness of the groove forming surface coating portion is referred to as $t2_{Max}$ (µm), such that Expressions (1) and (2) are satisfied,
wherein a value of 0.95 times a distance D of the tension coating along a sheet thickness direction from a bottom surface position of the groove forming surface coating portion to a bottom surface position of the flat surface coating portion is referred to as an effective depth d (µm), such that Expression (3) is satisfied, $$t2_{Min}/t1 \geq 0.4 \quad (1)$$

$$t2_{Max}/t1 \leq 3.0 \quad (2)$$

$$t2_{Max} \leq d/2 \quad (3),$$

wherein t1 is measured across at least 10 points on the flat surface coating portion in vicinity of the n grooves,
wherein $t2_{Min}$ is a minimum value of the thickness of the groove forming surface coating portion in a direction perpendicular to the groove forming surface for each of the n grooves,
wherein $t2_{Max}$ is a maximum value of the thickness of the groove forming surface coating portion in a direction perpendicular to the groove forming surface for each of the n grooves, and
wherein n≥10.

12. The grain-oriented electrical steel sheet according to claim 11, further comprising:
a glass coating formed between the base steel sheet and the tension coating and containing $Mg_2SiO_4$.

13. The grain-oriented electrical steel sheet according to claim 12,
wherein the glass coating is formed between the flat surface and flat surface coating portion and not formed between the groove forming surface and the groove forming surface coating portion.

14. The grain-oriented electrical steel sheet according to claim 11,
wherein a width of the groove forming surface for each groove is referred to as w (µm), such that Expression (4) is satisfied, $$d/w \geq \frac{1}{3} \quad (4).$$

15. The grain-oriented electrical steel sheet according to claim 11,
wherein a width of the groove forming surface for each groove is referred to as w (µm), such that Expression (5) is satisfied, $$(d/w) \times t2_{Max} \leq t1 \quad (5).$$

16. A method the grain-oriented electrical steel sheet according to claim 11, comprising:
a cold rolling step of manufacturing a cold-rolled base steel sheet;
a final annealing step of performing final annealing with secondary recrystallization on the cold-rolled base steel sheet;
a linear groove forming step of forming the plurality of n grooves on the cold-rolled base steel sheet before or after the final annealing step, the grooves being linear in a direction intersecting a rolling direction of the cold-rolled base steel sheet; and
a tension coating applying step of forming the tension coating on the plurality of n grooves.

17. The method according to claim 16, further comprising:

after the tension coating applying step, a tension coating shaping step of shaping the tension coating by processing the tension coating to leave a part of the tension coating in a thickness direction and reduce a thickness of a portion of the tension coating formed on the groove in a range narrower than a width of each groove.

18. The method according to claim 16, further comprising:
an annealing separating agent applying step of applying an annealing separating agent to the cold-rolled base steel sheet after the cold rolling step and before the final annealing step,
wherein the annealing separating agent contains magnesia.

* * * * *